Patented Sept. 6, 1938

2,128,962

UNITED STATES PATENT OFFICE 2,128,962

COATED OBJECTS

Gordon D. Patterson, Wilmington, Del., assignor to E. I. du Pont de Nemours & Company, Wilmington, Del., a corporation of Delaware No Drawing. Application June 8, 1936, Serial No. 84,232

13 Claims. (Cl. 91—68)

This invention relates to coated articles and their preparation, and more particularly to coated articles having under the coating a priming coat comprising deacetylated chitin.

The present application is a continuation in part of copending application Serial No. 11,320, filed March 15, 1935, which has issued as U. S. Patent 2,047,220, which is hereby incorporated herein.

Chitin is the chief component of the horny exoskeletons of crustacea such as shrimp, crabs, or lobsters. According to currently accepted theories, it is a polymer of an acetylated glucosamine. A method has recently been developed by George W. Rigby (U. S. Patent 2,040,879) for the chemical treatment of chitin with alkali under controlled conditions, whereby chitin is deacetylated to the extent that it becomes soluble in dilute aqueous acids but not to the point where the chitin molecule is so changed or degraded that the product is incapable of being formed into coherent films. This product, termed "deacetylated chitin," is the one which I use in my present invention, and by the quoted expression I imply a product which is soluble in aqueous acids and not degraded beyond the film-forming stage.

Rigid fibrous cellulosic materials used for construction purposes, such as wood, are customarily given protective or decorative coatings such as paint, enamel, lacquer, or the like. Due to the porosity of such base materials, special priming coats or additional coats of the regular finish must frequently be used to obtain good results. These are required to give full protection and/or to avoid the formation of low gloss or non-uniform areas disfiguring the normal appearance of the properly applied coating. Furthermore, even when properly applied, coatings frequently fail by blistering, peeling or flaking, especially when the rear of the coated base is exposed to water.

This invention has as an object a process for the preparation of improved coatings on rigid fibrous cellulosic surfaces of the type used as construction elements, such as wood. A further and more specific object is a process for sealing and subsequently coating rigid fibrous cellulosic surfaces in such a manner that the adhesion to such surfaces of the finish coat is improved. A still further object is the improved multicoated article produced by the process. Other objects will appear hereinafter.

These objects are accomplished by the following invention wherein a rigid fibrous cellulosic surface such as wood is coated with a solution of deacetylated chitin in aqueous acid, the coating is dried, and upon the coated surface thus produced there is applied a finishing top-coat of an organic film-forming material, particularly one based on a drying oil or drying oil modified alkyd resin. I have found that deacetylated chitin bonds strongly to wood and other types of rigid fibrous cellulosic surfaces used in the building industry, and that many coating compositions adhere to it in turn under adverse and severe conditions. The result is a surface which is protected to a greater degree than has heretofore been possible, as will be apparent from the subsequent more detailed description.

As previously indicated, I use in my invention a solution of deacetylated chitin in aqueous acid, which solution may if desired have liquids or solids emulsified or dispersed therein. In all cases, it may be said that I employ a water-soluble salt of deacetylated chitin in an aqueous menstruum. I prefer that the acid which is used to form this salt be one which is volatile, such as acetic, propionic, or formic. When volatile acids are used, the intermediate coating of deacetylated chitin is more readily rendered water-insoluble.

In the examples which follow, reference is made to deacetylated chitin of different viscosities in poises. This is the viscosity of an arbitrary standard, viz. a 5% solution in 5% aqueous acetic acid. Deacetylated chitin is further arbitrarily considered to be of the low viscosity type if the viscosity of the standard solution at 25° C. is in the range 1–35 poises, of the medium viscosity type if the standard is in the range 35–250 poises, of the high viscosity type if the standard is above 250 poises. In the present process all of these types may in general be used, but the type to be chosen for best results will obviously depend upon the particular effect desired. For maximum penetration and impregnation, dilute solutions of low viscosity deacetylated chitin are preferred. High viscosity deacetylated chitin is best for maximum sealing of the surface. Intermediate effects are obtained with the medium viscosity material.

As already stated, the present invention is generally applicable to the coating, with conventional coating compositions, of rigid fibrous cellulosic surfaces primed with deacetylated chitin. In the most important embodiment of the invention, a wooden surface is first primed with a solution of deacetylated chitin in a volatile aqueous acid, which solution may or may not contain an inert material, preferably a finely divided solid, dispersed therein. To the deacetylated chitin primed wood surface there is then applied an organic film-forming material, especially a composition containing or consisting of a film-forming polyhydric alcohol ester of drying oil acids, e. g., a drying oil or a drying oil modified alkyd resin. In the case of drying oils, excellent results have been obtained with white lead in oil paints having no zinc oxide and designed for use outdoors. In the case of oil modified alkyd resins, good results are most apparent when the resin contains not more than 50% oil.

Having thus outlined the principles of the invention the following exemplifications are added in illustration, but not in limitation.

*Example I*

One-half of a pine board was primed by brushing on a 2 per cent aqueous solution of the acetate of a medium viscosity grade of deacetylated chitin, the other half being left unprimed. After drying, the entire board was painted. Over the primed area the coating composition dried to a gloss equivalent to two normal coats of the same paint while over the unprimed area of the wood the paint was flat and spotted. Similar results are obtained with other rigid fibrous cellulosic base materials such as various types of wood including cedar, white pine and yellow pine, synthetic wall-boards used in the building trade, cardboard, plywood, boxboard, corrugated paper, and the like. The concentration of deacetylated chitin solution required for purposes such as that illustrated in this example will vary with the viscosity grade of the deacetylated chitin, smaller concentrations of high viscosity grades being required than of low. As already indicated, penetration into the base decreases with increasing viscosity. Grades having viscosities of 200–300 poises are in general to be preferred since 2-3 per cent solutions thereof in dilute aqueous acid are very effective in giving in one coat correct balance between sealing and penetration.

*Example II*

A wood surface badly stained by asphalt was painted with a 2 per cent solution in 0.7% acetic acid of 300-poise deacetylated chitin. A paint coat subsequently applied was stained by the asphalt only on the portions of the panel not primed by the deacetylated chitin. For purposes such as that illustrated in this example the deacetylated chitin of medium and high viscosity again is most effective. To illustrate further, a 2 per cent solution of a 200-poise deacetylated chitin gave decidedly better results over wood than a more concentrated solution of low viscosity deacetylated chitin, e. g., a 5 per cent solution of a 6-poise material. This sealing action of deacetylated chitin is especially evident with wooden surfaces. However, a beneficial effect is also secured over synthetic wall-boards and other rigid fibrous cellulosic construction materials. Not only does the deacetylated chitin seal against asphalt but also against oil-soluble dyes, creosote, and similar organic solvent soluble substances. It is useful in the priming of highly resinous woods to prevent the unsightly exudation of natural resins through the finish coat, and in sealing particularly resinous portions, such as knots.

Paints applied to wood the back of which is subsequently exposed to moisture frequently fail by blistering or peeling following loss of adhesion. Paints applied to wood and exposed to the weather often eventually become hard and brittle, and they frequently lose adhesion as is evidenced by the paint cracking and flaking off. By this invention it has been made possible to decrease the tendency of many coating compositions to fail in this way. In carrying out this part of my invention, I apply, as before, a deacetylated chitin-containing priming coat to the wood before applying the regular coating. In the examples which follow illustrating this, the aqueous solution of deacetylated chitin may optionally contain liquids or solids emulsified or dispersed therewith.

*Example III*

A very highly pigmented coating composition comprising 80 parts by weight of extended titanium pigment and 20 parts by weight of 62% linseed oil modified alkyd resin was made up and applied to white pine panels, some of them unprimed and others primed with 0.5 per cent solutions in acetic acid of medium viscosity deacetylated chitin. These panels were exposed to severe weathering conditions and examined for peeling and cracking. When the coating on the control panel had completely failed by peeling and cracking, that on the primed panel was still intact.

*Example IV*

A 0.5% solution of low viscosity deacetylated chitin in dilute acetic acid was applied as a prime coat to white pine panels. After thorough drying, three coats of a 48.6% oil modified alkyd resin enamel containing titanium oxide were applied and allowed to dry thoroughly. Control panels without a primer coat were similarly prepared and the backs of all panels were then exposed to moisture in the form of condensing steam at atmospheric pressure. Severe blistering occurred on the control panels while only a very few blisters were formed on the primed ones. The latter were inevitably between enamel coats rather than between wood and paint. Over the unprimed wood the coating could be stripped off after steam treatment, but over the primed wood, it was generally less difficult to separate one coat of paint from another than to separate paint from primed wood.

*Example V*

Dispersions of many finely divided solid materials in deacetylated chitin solutions are very effective for improving the adhesion or decreasing the blistering tendency of subsequent coatings. For example, an aqueous dispersion comprising 40 per cent of titanium dioxide and 2 per cent low viscosity deacetylated chitin (dissolved in acetic acid) was used as a primer for a 48.6% oil modified alkyd resin enamel. Severe accelerated tests showed only slight failure over primed wooden panels but almost complete failure on controls.

Instead of the titanium dioxide of Example V other finely divided relatively inactive solids or mixtures such as extended titanium pigments, zinc sulfide, lithopone, barytes, blanc fixe, aluminum stearate, asbestine, antimony oxide, silica, milori blue, chrome yellow, carbon black, or mixtures such as lithopone, mica and extended titanium dioxide can be dispersed in the deacetylated chitin solution. Basic pigments should be avoided. The ratio of deacetylated chitin to solid may vary over wide limits, from 5 to 25 per cent based on the pigment frequently being desirable, the preferred amount varying with the particular pigment and other properties desired. Concentraton of pigment may be varied from that in a flat wall paint, i. e., 40 to 50 per cent, to whatever lower value is desired.

Results similar to those described in Example IV were obtained with primed and unprimed panels painted with white lead in oil. In these experiments, however, the faces of the panels were exposed to severe atmospheric conditions outdoors while the backs of the panels were exposed to a humid atmosphere. Such improvement in blistering resistance is especially evident with paints having as a vehicle a drying oil or a drying oil modified natural or synthetic resin and, as the pigment, a zinc oxide-free system containing a titanium and/or lead pigment, such as titanium oxide and basic carbonate white lead. Specific examples of such paints are the well-known "white lead in oil," barium sulfate-extended titanium oxide in a 62% linseed oil modified glyceryl phthalate resin, and the zincless oil paint comprising 40 parts by weight of extended titanium pigment (75% BaSO₄ and 25% TiO₂), basic carbonate white lead 40 parts, and asbestine 20 parts, this pigment combination being used with a linseed oil vehicle containing about 8% of a 5-gallon ester gum or oil-soluble phenol-formaldehyde resin.

In the case of low viscosity deacetylated chitin, the process has been described for the most part in terms of 0.5 per cent solutions in acetic acid since this concentration is both economical and very effective. However, 0.25 per cent solutions are also effective and even 0.1 per cent solutions deposit sufficient priming material to cause noticeable improvement. While higher concentrations, that is, up to 6.0 per cent or even more have been used with favorable results, solutions of one-half to one per cent concentration applied so as to deposit from one-half to two ounces of deacetylated chitin per 1,000 square feet are preferred where improved adhesion as described above is the objective.

While medium or high viscosity deacetylated chitin or mixtures of various grades can be used to promote adhesion of the surface coat, low viscosity deacetylated chitin is the most practical and generally effective for this purpose. This is to be contrasted with the fact, already brought out, that the most effective sealing action against penetration of oils and solvents into the wood, and against bleeding of oil-soluble materials out of the wood, is obtained with medium and high viscosity deacetylated chitin.

The use as primers of deacetylated chitin solutions containing pigments has other effects in addition to improving adhesion. These pigmented solutions serve as a first paint coat, providing both sealing and hiding. Penetration of oils and solvents from subsequently applied coatings is prevented and bleeding of organic soluble materials from the wood such as asphalt, creosote, and resinous constituents is decreased or entirely prevented.

Deacetylated chitin emulsions of many materials liquid under conditions of emulsification are effective primers. For example, an aqueous emulsion comprising 20 per cent of a 65 per cent stearic acid modified alkyd resin and 2 per cent of medium viscosity deacetylated chitin as the acetate was very effective as a primer for a short oil modified alkyd resin enamel, improving adhesion and decreasing blistering. Aqueous deacetylated chitin emulsions of low melting alkyd resins, or of paints or enamels made with drying oil modified alkyd resins, are in general useful as primers. These emulsions may if desired have solids such as pigments, dispersed therein.

The deacetylated chitin solutions or disperse systems used in this invention may frequently be modified to advantage by inclusion of other materials such as wetting agents, softeners, solvents, mildew inhibitors, and chemical reactants. Wetting agents are frequently desirable to improve the uniformity of wetting of the base. Excess of wetting or certain other agents must be avoided when such materials tend to decrease the sealing effect of the deacetylated chitin coating.

When used as a primer or sealer, deacetylated chitin dries rapidly, is not attacked by alkalies but rather is insolubilized by them, and is not affected by organic solvents. When the deacetylated chitin is used in the grade and amount to form a perceptible film, this film is tough rather than brittle and does not become sticky or tacky from moisture.

As previously indicated, the advantages of the present invention are most evident where the finish coat consists of or comprises a film-forming polyhydric alcohol ester of drying oil acids, e. g., a drying oil (raw or bodied), a drying oil modified alkyd resin, or a varnish made by blending a drying oil with a natural or synthetic resin. However, it is within the scope of my invention to use as the top coat any organic film-forming material such as resinous polymers of monohydric alcohol esters of alpha-methylene monocarboxylic acids (e. g., ethyl acrylate and methyl alpha-methacrylate), vinyl resins such as vinyl chloride and vinyl acetate, chlorinated rubbers, phenol-and urea-formaldehyde resins, and cellulose derivatives such as nitrocellulose, cellulose acetate and ethyl cellulose. Any of these substances may be suitably plasticized and pigmented, as desired.

In improving the adhesion of coating compositions, particularly white lead in oil, alkyd resin coatings and especially short oil modified alkyd resin coatings, deacetylated chitin is unique in that compositions containing it are almost the only materials of many dozens tested which show this property. Zinc-oxide-free oil paints are caused to adhere to wooden surfaces particularly well, such typical paints being those containing basic carbonate white lead, or titanium pigments, such as metallic titanates and titanium oxide, alone or extended with such materials as barium sulfate, calcium sulfate, or siliceous material.

By the term alkyd resin coating is meant a coating comprising the well-known drying oil modified alkyd resins made by methods known in the art, one such method being the reaction of drying oil acids with glycerol and phthalic anhydride as described by Kienle, U. S. Patent 1,893,873. By short oil alkyd resins are meant those containing 50 per cent or less of drying oil—one such resin containing, for example, 34.7 per cent of linseed oil and 13.9 per cent of China-wood oil and being made from the quantities of glycerol, phthalic anhydride, and acids of the two oils calculated to give a final product of this oil content. By long oil modified alkyd resins are meant those having more than 50 per cent of drying oil in the resin, e. g., that containing 62 per cent of linseed oil and made from glycerol, phthalic anhydride and linseed oil acids.

The finish coat may in some instances be an aqueous system containing the organic film-forming material, e. g., an aqueous emulsion of a paint.

In order to promote drying and insolubilization of the deacetylated chitin priming coat, it may be heated or chemically treated, as with ammonia, alkali, alum, formaldehyde, anhydrides, acetic anhydride, ketene, acetyl chloride, or other compounds which react with the alcoholic and amino hydrogen atoms in the deacetylated chitin. Heating is a preferred method because of simplicity and effectiveness. Where the term deacetylated chitin is used in the claims without a recitation indicative of the material being in solution, the term includes derivatives, for example, the insolubilized formaldehyde treated, the acetic anhydride or acetyl chloride treated, etc., derivatives and the like.

The above description and examples are intended to be illustrative only. Any modification of or variation therefrom which conforms to the spirit of the invention is intended to be included within the scope of the claims.

I claim:

1. A product comprising a rigid fibrous cellulosic material having a priming coat thereon comprising deacetylated chitin and over said priming coat a water-impermeable surface coating of an organic film-forming material.

2. A product comprising a rigid fibrous cellulosic material having a primary coat thereon comprising deacetylated chitin and over said priming coat a water-impermeable surface coating comprising a film-forming polyhydric alcohol ester of drying oil acids.

3. A product comprising a rigid fibrous cellulosic material having a priming coat thereon comprising deacetylated chitin and over said priming coat a water-impermeable surface coating of a white lead in oil paint.

4. A product comprising a rigid fibrous cellulosic material having a priming coat thereon comprising deacetylated chitin and over said priming coat a water-impermeable surface coating of a drying oil modified alkyd resin.

5. A product comprising wood having a priming coat thereon comprising deacetylated chitin and over said priming coat a water-impermeable surface coating of an organic film-forming material.

6. A product comprising wood having a priming coat thereon comprising deacetylated chitin and over said priming coat a surface coating comprising a film-forming polyhydric alcohol ester of drying oil acids.

7. A product comprising wood having a priming coat thereon comprising deacetylated chitin and over said priming coat a surface coating comprising a zinc oxide free, pigmented, film-forming polyhydric alcohol ester of drying oil acids.

8. A product comprising wood having a priming coat thereon comprising deacetylated chitin and over said priming coat a surface coating comprising a titanium pigmented, film-forming polyhydric alcohol ester of drying oil acids.

9. A product comprising wood having a priming coat thereon comprising deacetylated chitin and over said priming coat a surface coating comprising a zinc oxide free, titanium pigmented, film-forming polyhydric alcohol ester of drying oil acids.

10. A product comprising wood having a priming coat thereon comprising deacetylated chitin and over said priming coat a surface coating comprising a film-forming polyhydric alcohol ester of drying oil acids pigmented with basic carbonate white lead.

11. A product comprising wood having a priming coat thereon comprising deacetylated chitin and over said priming coat a surface coating of a white lead in oil paint.

12. A product comprising wood having a priming coat thereon comprising deacetylated chitin and over said priming coat a surface coating comprising a drying oil modified alkyd resin.

13. A product comprising wood having a priming coat thereon comprising deacetylated chitin and over said priming coat a surface coating comprising a drying oil.

GORDON D. PATTERSON.